June 29, 1965  K. W. H. LEIBFRITZ  3,191,626
VALVE
Filed Dec. 13, 1962

INVENTOR.
KURT W. H. LEIBFRITZ
BY
John N. Wolfram
ATTORNEY

United States Patent Office 3,191,626
Patented June 29, 1965

3,191,626
VALVE
Kurt W. H. Leibfritz, Norridge, Ill., assignor to Parker-Hannifin Corporation, Cleveland, Ohio, a corporation of Ohio
Filed Dec. 13, 1962, Ser. No. 244,508
13 Claims. (Cl. 137—625.69)

This invention relates to valves and more particularly to a valve having resilient sealing members.

The invention is particularly adapted to valves of the spool type in which the spool has grooves carrying resilient sealing members for sealing against the wall of the bore in which the spool is mounted.

It is an object of the invention to provide a spool valve having resilient sealing members carried in grooves on the spool in which the bottoms of the grooves are vented in a manner for preventing blow out of the resilient members from the grooves by fluid pressure.

It is another object to provide a valve of the type described in which the groove bottoms are vented to either of two low pressure zones in the valve, depending upon which of the zones at that moment has the lower pressure.

It is another object to provide a valve of the type described in which venting of the groove carrying a resilient sealing ring is accomplished through a bleed passage and where in the bleed passage is normally closed by a valving device which is responsive to a differential in pressure between the bleed passage and a low pressure zone in the valve for opening the bleed passage.

It is another object to provide a valve of the type described in which O-rings of rubberlike material are utilized as the seal on the valve spool which is to be vented and for the valving device which controls the bleed passage.

Figure 1:
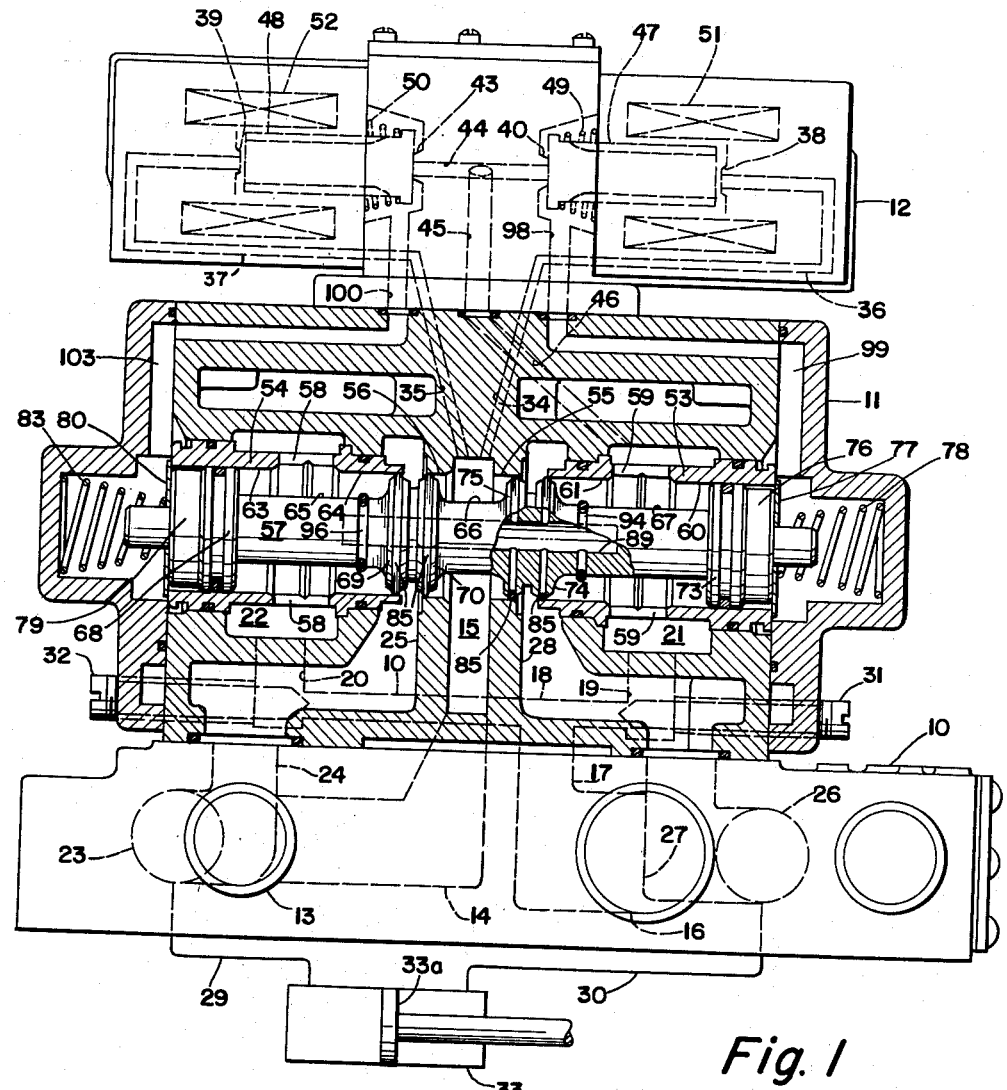
Figure 2:
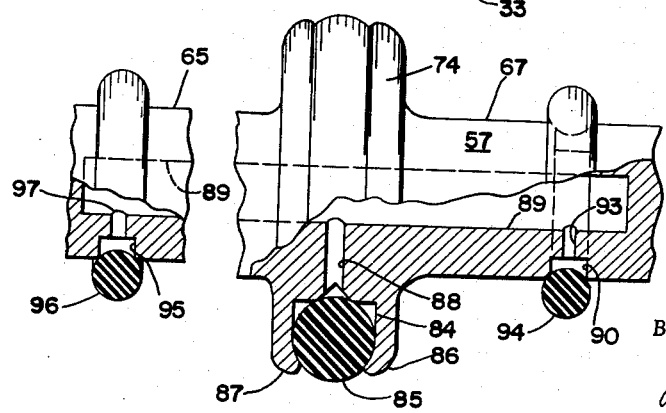

Other objects of the invention will be apparent from the following description and from the drawings in which, FIG. 1 is a view, partly in cross section, of a solenoid pilot operated spool valve embodying the invention and FIG. 2 is an enlarged fragmentary view, partly in section, of the spool.

The valve assembly includes a manifold housing 10 attached to a main valve housing 11 and a solenoid operated pilot valve section 12 which is also attached to main valve 11. The manifold housing 10 has an inlet port 13 connected by a passage 14 with a pressure chamber 15 within the main valve. An exhaust port 16 is connected by means of passages 17 and 18 with passages 19 and 20, the latter being connected with exhaust chambers 21 and 22, respectively.

On an opposite face of housing 10 there is a cylinder port 23 connected by passage 24 with a cylinder passage 25. There is also a cylinder port 26 connected by means of a passage 27 with cylinder passage 28. As shown schematically, cylinder ports 23 and 26 may be connected by means of pipe lines 29 and 30 with opposite ends of a fluid pressure operated motor 33 having a piston 33a. Restrictor valves 31 and 32 are mounted for adjustable throttling of exhaust flow from passages 19 and 20 to passage 18, respectively, for controlling the speed with which piston 33a may reciprocate.

Pressure passage 15 has a pair of passages 34, 35 leading therefrom and respectively communicating by way of passages 36, 37 in pilot valve housing 12 with a pair of solenoid operated pilot valves housed therein. Thus, passage 36 leads to a valve seat 38 and passage 37 leads to a valve seat 39. There are also valve seats 40, 43 in pilot valve section 12, each of which communicates with a passage 44. The latter is connected by means of passages 45 and 46 with exhaust chamber 21.

Solenoid armatures 47 and 48 serve as valve elements for alternately opening and closing the respective seats 38, 40 and 39, 43. When the solenoids are not energized, spring 49 normally seats pilot valve 47 on seat 40 and spring 50 normally presses pilot valve 48 against seat 43 to close off exhaust passage 44 from the interior of the two solenoid valves. At this time armatures 47, 48 are unseated from seats 38 and 39 respectively.

Main valve housing 11 has a pair of sleeves 53, 54 therein which with openings 55, 56 form a valve bore in which spool valve 57 is slidably mounted. Sleeve 54 has radial openings 58 which communicate with annular exhaust chamber 22 surrounding sleeve 54. Likewise, sleeve 53 has radial openings 59 communicating with like exhaust chamber 21. Sleeve 53 has smooth bore portions 60, 61 on opposite sides of openings 59 and sleeve 54 has smooth bore portions 63, 64 on opposite sides of openings 58.

Pressure passage 15 surrounds the valve bore and communicates therewith, as do cylinder passages 25, 28.

Valve spool 57 has reduced diameter portions 65, 66 and 67 which permit flow between selected passages when the valve spool is shifted from the neutral or central position shown. The valve spool also has full diameter portions 68, 69, 70, 73, 74 and 75, each of which carries an O-ring of resilient material for making sealing contact with the valve bore. Full diameter portions 68 and 73 also serve as pistons for causing shifting of the valve spool as hereinafter described.

Adjacent full diameter portion 73 is a button 76 loosely fitted within bore 60 and a washer 77 of greater diameter than this bore, and a spring 78 which bears upon washer 77. There is a like button 79, washer 80, and spring 83 adjacent full diameter portion 68.

As shown in FIG. 2, full diameter portion 74 has an annular groove 84 therein for receiving O-ring 85. The O-ring is retained within the groove by bending over the side walls of the latter, as indicated at 86, 87 so that the opening of the groove is narrower than the width of the O-ring. In addition, the side walls of the groove, either at or below retaining lips 86, 87, make sealing contact with the O-ring so that fluid under pressure along the exterior of the O-ring does not have ready access to the bottom of groove 84. A passage 88 connects the bottom of groove 84 with a chamber 89 formed within valve spool 57. There is a like O-ring 85, groove 84, and relief passage 88 for each of the enlarged portions 69, 70 and 75.

Reduced diameter portion 67 has a groove 90 which in all positions of spool 57 is exposed to openings 59 and hence to exhaust chamber 21. A bleed or relief passage 93 connects the bottom of groove 90 with chamber 89. An O-ring 94 of greater width than groove 90 seats on the edges of the groove with a slight stretch fit so that it will normally close the groove and extend part way therein to retain its position on spool portion 67.

Reduced diameter portion 65 has a like groove 95, O-ring 96, and a bleed passage 97.

In operation, with both solenoids 51, 52 de-energized, springs 49, 50 hold armatures 47, 48 against seats 40, 43 for closing off exhaust passage 44. Fluid under pressure from passage 15 makes its way through passages 34, 36, seat 38, around armature 47, through passages 98 and 99 to the outer end face of full diameter portion 73. At the same time, pressure fluid flows through passages 35, 37, seat 39, around armature 48 and through passages 100 and 103 to the outer face of full diameter portion 68. Thus there is equal pressure acting on opposite ends of spool 57 and the latter will be in the neutral position as shown. At this time springs 78 and 83 are prevented by washers 77 and 80 from exerting any pressure upon the spool.

With valve spool 57 in neutral position, pressure fluid in passage 15 is blocked by full diameter portions 70, and 75 with the O-rings 85 therein establishing sealing contact in bore portions 55 and 56. Meanwhile, full diameter portions 74 and 69 isolate cylinder passage 28 from exhaust chamber 21 and cylinder passage 25 from exhaust chamber 22, respectively.

When solenoid coil 51 is energized, armature 47 moves to the right against seat 38 to close passage 36 and cut off supply of pressure fluid to the outer end of full diameter spool portion 73. At the same time, armature 47 moves away from seat 40 to open exhaust passage 44 and thus permit exhausting of the pressure fluid from the outer face of full diameter portion 73 to exhaust chamber 21 by way of passages 99, 98, seat 40, and passages 44, 45, and 46. The pressure on the outer face of full diameter portion 68 then causes valve spool 57 to move to the right, compressing spring 78. In this position, full diameter portion 75 enters bore portion 61 and full diameter portion 69 enters bore portion 56 so that pressure fluid will flow from passage 15 to cylinder port 28 while fluid from cylinder passage 25 flows into exhaust chamber 22, thus causing piston 33a to move to the left.

De-energizing of solenoid 51 permits spring 49 to return armature 47 to seat 40 for cutting off exhaust passage 44 and again opening seat 38 to permit pressure fluid to flow to the outer face of full diameter spool portion 73 for balancing the fluid pressure acting on the opposite end of the spool. This permits spring 78 to return the spool to neutral.

In a similar manner, energizing of solenoid 52 causes spool 57 to move to the left for connecting pressure passage 15 with cylinder port 25 and connecting cylinder passage 28 with exhaust chamber 21 for causing piston 33a to move to the right.

In the various positions of spool 57 the O-rings 85 will at times have one side of their outer surfaces exposed to fluid under high pressure and the other side of the outer surfaces exposed to a lower pressure. In the event fluid should leak past the O-ring into the bottom of groove 84, there would be a tendency for the pressure of the fluid in the bottom of the groove to blow the O-ring out of the groove and this would occur when the O-ring passes out of a bore portion into a passage portion of lower pressure surrounding the valve bore. To prevent such blow out, the bottom of each groove 84 is vented by means of passages 88, chamber 89, bleed passages 93, 97, and grooves 90, 95 exhaust chamber 21, 22.

As previously indicated, groove 90 is at all times exposed to exhaust chamber 21, and groove 95 is at all times exposed to exhaust chamber 22. O-rings 94, 96 act as check valves to normally close grooves 90, 95 but are responsive to differentials of pressure in groove 90 over that in chamber 21, and that in groove 95 over that in chamber 22, for opening and closing such grooves 90, 95. Thus, when the pressure of leakage fluid in groove 90 is greater than pressure in exhaust chamber 21, O-ring 94 will stretch slightly to open groove 90 and permit fluid to flow therefrom into chamber 21. Likewise, when the pressure in groove 95 is greater than that in exhaust chamber 22, O-ring 96 will stretch slightly to open groove 95 and permit fluid therefrom to flow into exhaust chamber 22.

It will be seen that chamber 89 connects all of the passages 88 with both grooves 90, 95. Although in some instances it is sufficient to provide only one or the other of grooves 90, 95 since both connect chamber 89 with an exhaust port, there are other times in which it is desirable to have both. Thus for example, when restrictor valve 31 is positioned for throttling exhaust flow from chamber 21 and passage 19 into passages 18, 17, and out through port 16, to control the speed of piston 33a in moving to the right, there may be considerable back pressure developed within chamber 21 and sleeve 53 which at times may even exceed the pressure in passage 15. At such times O-ring 94 will remain seated on the edges of groove 90 to prevent back flow of fluid from within sleeve 53 to chamber 89. At the same time leakage fluid in chamber 89 from past O-rings 85 will escape through passage 97 and past O-ring 96 to exhaust chamber 22 and passages 20, 18, and 17 to exhaust port 16.

In a similar manner, when restrictor valve 32 is positioned for throttling exhaust flow from passage 20 to passage 18 for controlling the speed of piston 33a in moving to the left, the pressure of exhaust fluid within sleeve 54 can build up to exceed pressure of leakage fluid in chamber 89, at which time exhaust pressure within sleeve 53 will be low and pressure in chamber 89 will be relieved through passage 93 and the unseating of O-ring 94. Thus either O-ring 94 or O-ring 96 will unseat to pass leakage fluid from chamber 89 depending upon which of exhaust chambers 21 or 22 has the lower pressure at that instant.

Since O-rings 94, 96, are a slight stretch fit in their grooves, the latter will be closed when the pressure in chamber 89 is lower than in the respective exhaust chamber 21, 22.

For some installations O-rings 94, 96 may be dispensed with because either there may be no occasions in which the back pressure in exhaust chambers 21, 22 would build up sufficiently to cause unseating of O-ring 85 or because there will be sufficient relieving action through one of the bleed passages 93, 97 to prevent detrimental build up of pressure in passage 88 when high back pressure develops in the exhaust chamber 21 or 22 associated with the other of the bleed passages.

If desired, the ends of spool 57 may be exhausted of pressure, instead of pressurized, when the solenoids are in de-energized condition. In such an arrangement passages 34, 35 and 45 are omitted, chamber 15 is connected to passage 44 and passages 36 and 37 are connected to exhaust passage 46. Then when the solenoids are both de-energized, springs 49 and 50 keep armatures 47, 48 in position for closing seats 40 and 43 and opening seats 38, 39 to connect both ends of spool 57 to exhaust passage 46. Upon energizing of solenoid 51, armature 47 closes the exhaust passage for the right hand end of spool 57 at seat 38 and opens seat 40 for admitting fluid under pressure to the right hand end of spool 57 to shift the latter to the left. Similarly, spool 57 may be caused to move to the right by energizing solenoid 52 instead of solenoid 51.

Although one form of the invention has been illustrated, it is obvious that the invention as covered by the following claims may have various other detail forms.

I claim:

1. In a valve, a body having a bore, a high pressure passage, a cylinder passage, and first and second exhaust passages intersecting said bore at spaced locations, a valve member shiftable in said bore and having spaced sealing and porting means for closing and opening communication between selected ones of said passages, first and second bleed passages in said valve member communicating with each other and constantly exposed to said first and second exhaust passages respectively, said sealing means including a resilient member mounted in a groove in said valve member, passage means for directing fluid leaking along said bore past said resilient member to the bottom of said groove to said bleed passages, and valving means associated with each bleed passage and responsive to a higher pressure in the associated bleed passage than in the corresponding exhaust passage for opening such bleed passage.

2. A valve in accordance with claim 1 in which each of said bleed passages includes an annular groove in said valve member and each of said valving means comprises a resilient member for opening and closing the respective annular groove.

3. A valve in accordance with claim 1, in which both said valving means is responsive to substantially the same pressure differential for opening the respective bleed passage whereby the bleed passage opposite the exhaust passage having the lower pressure will open first.

4. A valve in accordance with claim 1 in which a portion of the groove side wall overlaps a portion of the resilient member for mechanically restraining the resilient member against displacement from the groove.

5. A valve in accordance with claim 1 in which each of said bleed passages includes an annular groove in said valve member and each of said valving means comprises a resilient O-ring surrounding the respective annular groove and movable for opening and closing the same.

6. A valve in accordance with claim 1 in which at least one of said bleed passages includes an annular groove in said valve member and said valving means associated therewith comprises an O-ring of greater cross section diameter than the width of the annular groove and said O-ring makes sealing contact with the radially outer edges of said annular groove for closing the last mentioned bleed passage.

7. A valve in accordance with claim 1 in which each of said bleed passages includes an annular groove in said valve member and each of said valving means comprises an annular resilient member stretched over the respective annular groove and making sealing contact with the outer edges thereof, each annular resilient member being deformable out of such sealing contact by pressure of fluid within the associated annular groove.

8. A valve in accordance with claim 1 in which at least one of said bleed passages includes an annular groove in said valve member and the valving means associated with said one bleed passage comprise an annular resilient member movable into and out of seating contact with at least one side of said groove for closing and opening the same, said annular resilient member being out of contact with the bottom of said groove to form a space therebetween, said space being connected to said passage means whereby leakage fluid from said passage means has access to the entire area of the annular resilient member exposed to said space for applying pressure to said annular resilient member for unseating the same.

9. A valve in accordance with claim 1 in which each of said exhaust passages have a flow restrictor therein for controlling the rate at which fluid may be exhausted therethrough.

10. In a valve, a body having a bore, a high pressure passage intersecting said bore, cylinder passages intersecting the bore on opposite sides of said pressure passage, first and second exhaust passages intersecting the bore beyond the cylinder passages, a valve spool shiftable in said bore and having spaced full and reduced diameter portions for respectively closing and opening communication between selected ones of said passages, a chamber within said spool, a first bleed passage leading from said chamber to a first of said reduced diameter portions and constantly exposed to said first exhaust passage, a second bleed passage leading from said chamber to a second of said reduced diameter portions and constantly exposed to said second exhaust passage, a full diameter portion of said spool being located on each side of said pressure passage when said spool is in one position, each of said last mentioned full diameter portions having a groove therein, a resilient sealing member in each groove, passage means connecting the bottom of each of said grooves with both of said bleed passages for conducting fluid leaking past said resilient members to said groove bottoms to said exhaust passages so as to vent the under side of said resilient members to prevent fluid within said groove from blowing said resilient members from said grooves.

11. A valve in accordance with claim 10 in which there is a valving means carried by each of said first and second reduced diameter portions and responsive to differentials in pressure between the respective bleed and exhaust passages for opening and closing the respective bleed passage.

12. In a valve, a body member having a valve bore and a plurality of fluid passages communicating therewith, one of said passages being a high pressure passage and first and second of said passages other than the high pressure passage being low pressure passages, a valve member in said bore having means for connecting said high pressure passage to one of said plurality of passages through said bore in one position of said valve member, a bleed passage in one of said members constantly exposed to said first lower pressure passage and a second bleed passage in said one member constantly exposed to said second lower pressure passage, sealing means for sealing said valve member with respect to said body to prevent passage of fluid from said high pressure passage through said bore to said other passage in another position of the valve member, and passage means in one of said members communicating with the sealing means for directing fluid leaking from said high pressure passage past said sealing means to both of said bleed passages, a differential pressure operated valve device associated with each of said bleed passages and operable for directing the flow of said leakage fluid to the respective low pressure passage when the pressure of the leakage fluid exceeds the pressure of fluid within such low pressure passage.

13. In a valve, a body member having a valve bore and a plurality of fluid passages communicating therewith, one of said passages being a high pressure passage and first and second of said passages other than the high pressure passage being low pressure passages, a valve member in said bore having means for connecting said high pressure passage to one of said plurality of passages through said bore in one position of said valve member, a bleed passage in one of said members constantly exposed to said first lower pressure passage and a second bleed passage in said one member constantly exposed to said second lower pressure passage, sealing means for sealing said valve member with respect to said body to prevent passage of fluid from said high pressure passage through said bore to said other passage in another position of the valve member, and passage means in one of said members communicating with the sealing means for directing fluid leaking from said high pressure passage past said sealing means to both of said bleed passages, there being a member of resilient material for opening and closing each of said bleed passages in response to differentials of pressure in the respective bleed and low pressure passages.

References Cited by the Examiner
UNITED STATES PATENTS 1,366,151   1/21   Astrom.
2,542,390   2/51   Brown _____ 137—625.48

M. CARY NELSON, *Primary Examiner.*

MARTIN P. SCHWADRON, *Examiner.*